United States Patent
Yalawarmath et al.

(10) Patent No.: US 12,418,431 B2
(45) Date of Patent: Sep. 16, 2025

(54) SCHEDULED CONFERENCE RECORDING

(71) Applicant: Mitel Networks Corporation, Kanata (CA)

(72) Inventors: Anilkumar Yalawarmath, Attiguppe Bengaluru (IN); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 2 days.

(21) Appl. No.: 17/527,795

(22) Filed: Nov. 16, 2021

(65) Prior Publication Data
US 2023/0155850 A1  May 18, 2023

(51) Int. Cl.
*H04L 12/18* (2006.01)
*H04L 65/1083* (2022.01)

(52) U.S. Cl.
CPC ...... *H04L 12/1818* (2013.01); *H04L 12/1831* (2013.01); *H04L 65/1083* (2013.01)

(58) Field of Classification Search
CPC ............. H04L 12/1818; H04L 12/1831; H04L 65/1083
See application file for complete search history.

(56) References Cited

U.S. PATENT DOCUMENTS

| | | | | |
|---|---|---|---|---|
| 8,868,650 | B1* | 10/2014 | Reeves | H04L 65/1069 709/204 |
| 10,785,450 | B1* | 9/2020 | van Rensburg | H04L 65/1083 |
| 11,983,674 | B2* | 5/2024 | Hilleli | G06N 20/20 |
| 2007/0033528 | A1* | 2/2007 | Merril | H04N 9/641 715/732 |
| 2012/0166242 | A1* | 6/2012 | Bentley | G06Q 10/06311 705/7.13 |
| 2015/0081806 | A1* | 3/2015 | Kanuturi | G06Q 10/1095 709/206 |
| 2015/0249747 | A1* | 9/2015 | Boss | H04M 3/56 379/85 |
| 2018/0191907 | A1* | 7/2018 | Herrin | H04L 12/1831 |
| 2018/0232705 | A1* | 8/2018 | Baker | G06F 3/04817 |
| 2019/0108492 | A1* | 4/2019 | Nelson | G06Q 10/1095 |
| 2021/0092168 | A1* | 3/2021 | Ranalli | H04L 12/1822 |
| 2021/0320811 | A1* | 10/2021 | Constantinides | H04L 12/1831 |
| 2021/0367801 | A1* | 11/2021 | Rajamani | H04L 12/1818 |
| 2021/0399911 | A1* | 12/2021 | Jorasch | H04L 12/1822 |
| 2022/0318761 | A1 | 10/2022 | Chopdekar et al. | |
| 2022/0327494 | A1* | 10/2022 | Deole | H04L 12/1818 |

FOREIGN PATENT DOCUMENTS

CN  106506603 A  3/2017

* cited by examiner

*Primary Examiner* — Nam T Tran

(57) ABSTRACT

Systems and methods for virtual meetings allow a recipient of a request to attend a meeting alternate options to: not attend the meeting but record all or part(s) of the meeting, or to attend the meeting and record all or part(s) of the meeting. In an embodiment, a conferencing system comprising a conferencing server is in communication with a participant device. The conferencing server sends the participant device a meeting request which includes recording options available to the recipient. The communication may include metadata that assists the conferencing system to identify the part(s) of the meeting the recipient wishes to be recorded.

20 Claims, 11 Drawing Sheets

SCHEDULED CONFERENCE RECORDING

FIELD

The present disclosure generally relates to methods and systems for scheduling meetings that permit recipients of meeting requests the option of recording all or part of a meeting.

BACKGROUND

The contents of U.S. patent application Ser. No. 15/832,236, entitled "Method and System for Participating in an Electronic Communication Using Virtual Presence," which was filed on Dec. 5, 2017, are incorporated herein by reference to the extent they do not conflict with this application.

Electronic communications, such as audio and video conferences (also called "meetings") can be used to allow persons to virtually participate in a meeting. Such communications allow persons to participate in a meeting without having to travel to a common location. Persons can also participate in meetings in person and others could potentially participate in the same meeting via electronic communications.

Persons often are invited to several meetings, and some meetings result in conflicts due to overlaps with other meetings, tasks, or events (collectively, "event" or "events"). When a person cannot attend a meeting or part of a meeting, one or more important agenda items of the meeting could be missed.

Presently, when a meeting request is received, the recipient may respond in several ways, such as "Accept," "Tentative," "Decline," or "Propose New Time." The meeting may be declined if the person is unable to attend due to a conflict. The recipient may instead select the "Tentative" option if the meeting is important but overlaps with another important event, because the recipient may be able to attend part of the meeting, or the other important event might be cancelled, completed, or rescheduled. In case of a conflict, another option the recipient has is to propose a new meeting time to the host.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth herein, exemplary embodiments of the disclosure provide systems and methods to provide one or more options to a recipient of a meeting (such as a video and/or audio meeting and/or in-person meeting) request to record all or a part of the meeting. As used herein, "part" of a meeting means one or more parts of the meeting. The recording options available to the recipient include (a) Accept (and schedule a recording of all or part of the meeting), (b) Tentative (and schedule a recording of all or part of the meeting), (c) Decline (and schedule a recording of all or part of the meeting), (d) Propose New Time (and schedule a recording of all or part of the meeting), or (e) Record all or part of the meeting. These options may be in addition to standard Accept, Tentative, Decline, and Propose New Time options.

The recording of the meeting or part thereof could be an audio recording, audio/video recording, or simply a video recording (especially if the important material for the meeting or part thereof that is to be recorded is a visual aide, such as drawings, slides, or video). To make an audio recording a system according to this disclosure may include a microphone in communication with, for example, conference server (126) or recording server (134). To make a video recording a system according to this disclosure may include a PVR (Personal Video Recorder) in communication with, for example, conference server (126) or recording server (134).

Figure 1:
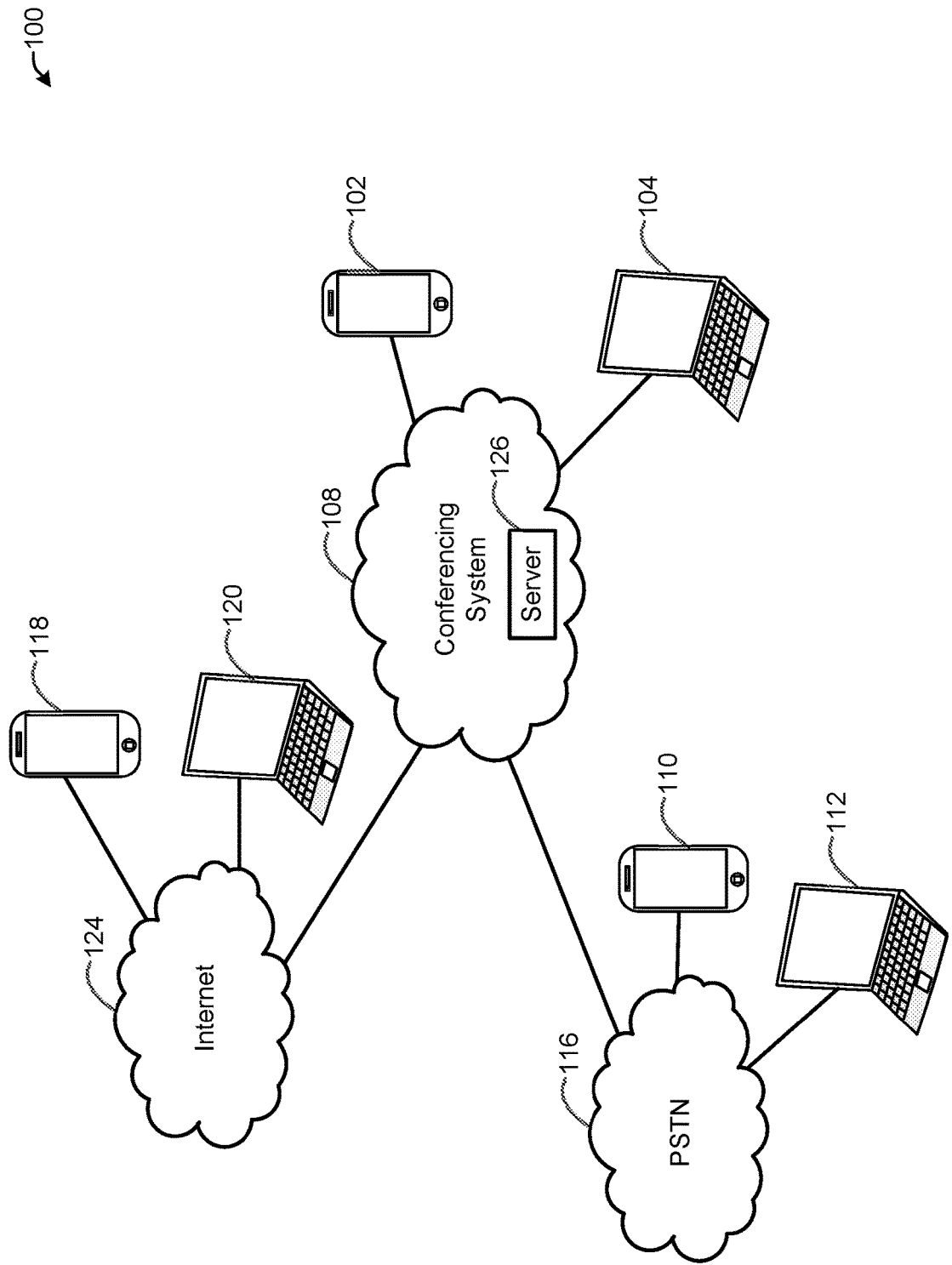
FIG. 1 illustrates a communication system in accordance with exemplary embodiments of this disclosure.

FIG. 1 illustrates an electronic communication system (100) in accordance with various embodiments of this disclosure. Communication system (100) includes a conferencing system (108) having a conferencing server (or server) (126).

Conferencing system (108) can part of or connected to, for example, an internet protocol (IP) network, such as a local area network, a wide-area network, a metropolitan area network, and wireless networks. Various participant devices (described further, below) of system (100) can be coupled to one or more other components of system (100) using an Ethernet connection, other wired connections, and/or wireless interfaces. As illustrated, conferencing system (108) can be coupled to other networks and/or to other devices typically coupled to networks. Conferencing system (108) can be coupled to the Internet (124) via a web portal and/or PSTN (116) via the gateway/SBC.

Conferencing system (108) includes a conference server (126). Conference server (126) can include or be any suitable system/server that provides a connection between one or more participant devices (102, 104 110, 112, 118, and/or 120). The conference server (126) can include suitable conferencing tools and modules and connect/bridge various participant devices to a meeting, perform mixing of the media, and send media to active and virtual participants of a meeting. In accordance with exemplary embodiments of the disclosure, server (126) is a conference server configured to perform various functions, described in more detail below.

In communication with conferencing system (108) and conferencing server (126) are one or more participant devices (102, 104, 110, 112, 118, and/or 120). In the illustrated example, the one or more participant devices (102, 104, 110, 112, 118, and/or 120) are also coupled to a public switched telephone network (PSTN) 116 and to the Internet (124).

The one or more participant devices (102, 104, 110, 112, 118, and/or 120) can include any suitable device with wired or wireless communication (e.g., audio and/or video) features. For example, any of the one or more participant devices (102, 104, 110, 112, 118, and/or 120) can be a wearable device, a tablet computer, a mobile phone, a personal (e.g., laptop or desktop) computer, a streaming device, such as a game console or other media streaming device, or the like. The one or more participant devices can include an application and be configured to perform various functions as set forth herein.

Figure 2:
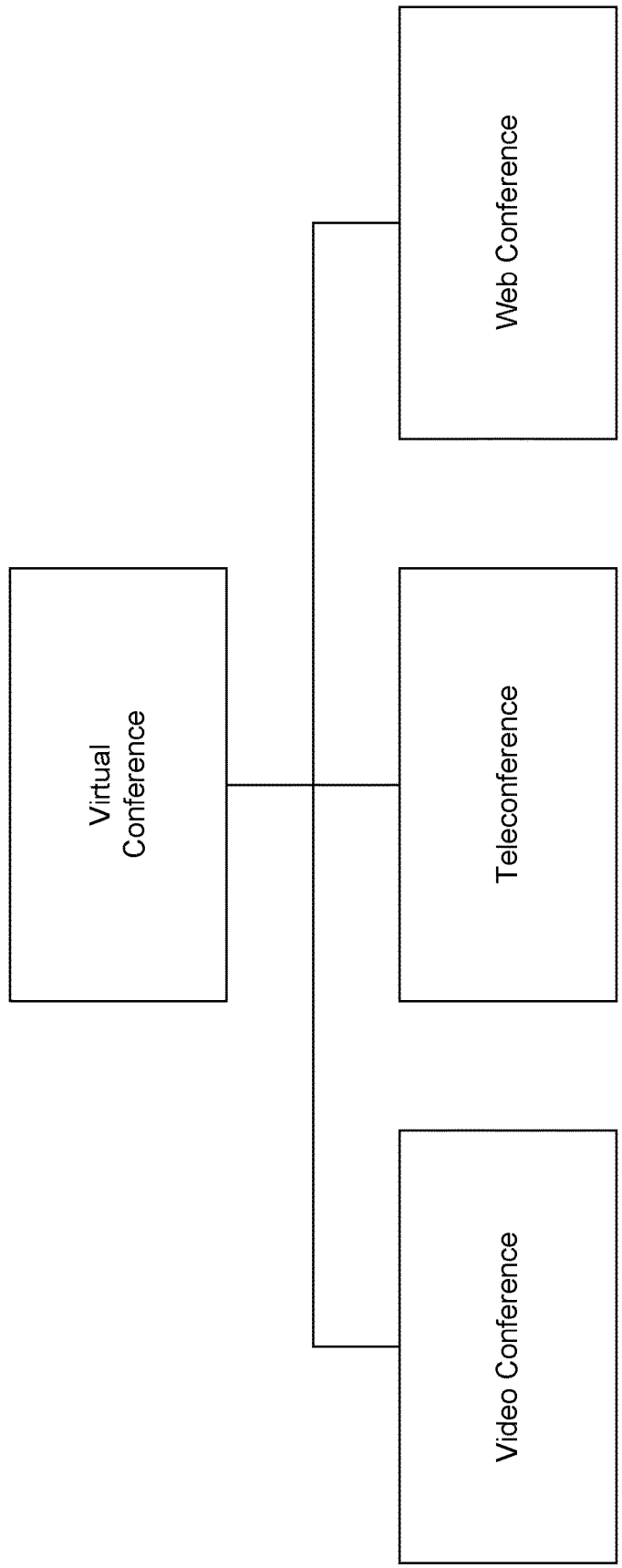
FIG. 2 illustrates virtual meeting options.

FIG. 2 illustrates exemplary forms of virtual conferencing (or meeting), including video conferencing, telephone conferencing, and web conferencing. Methods and systems of this disclosure may be used with one or more forms of virtual meetings and/or with in-person meetings, or meetings that are attended by some persons in person and attended by others via electronic communications.

Figure 3:
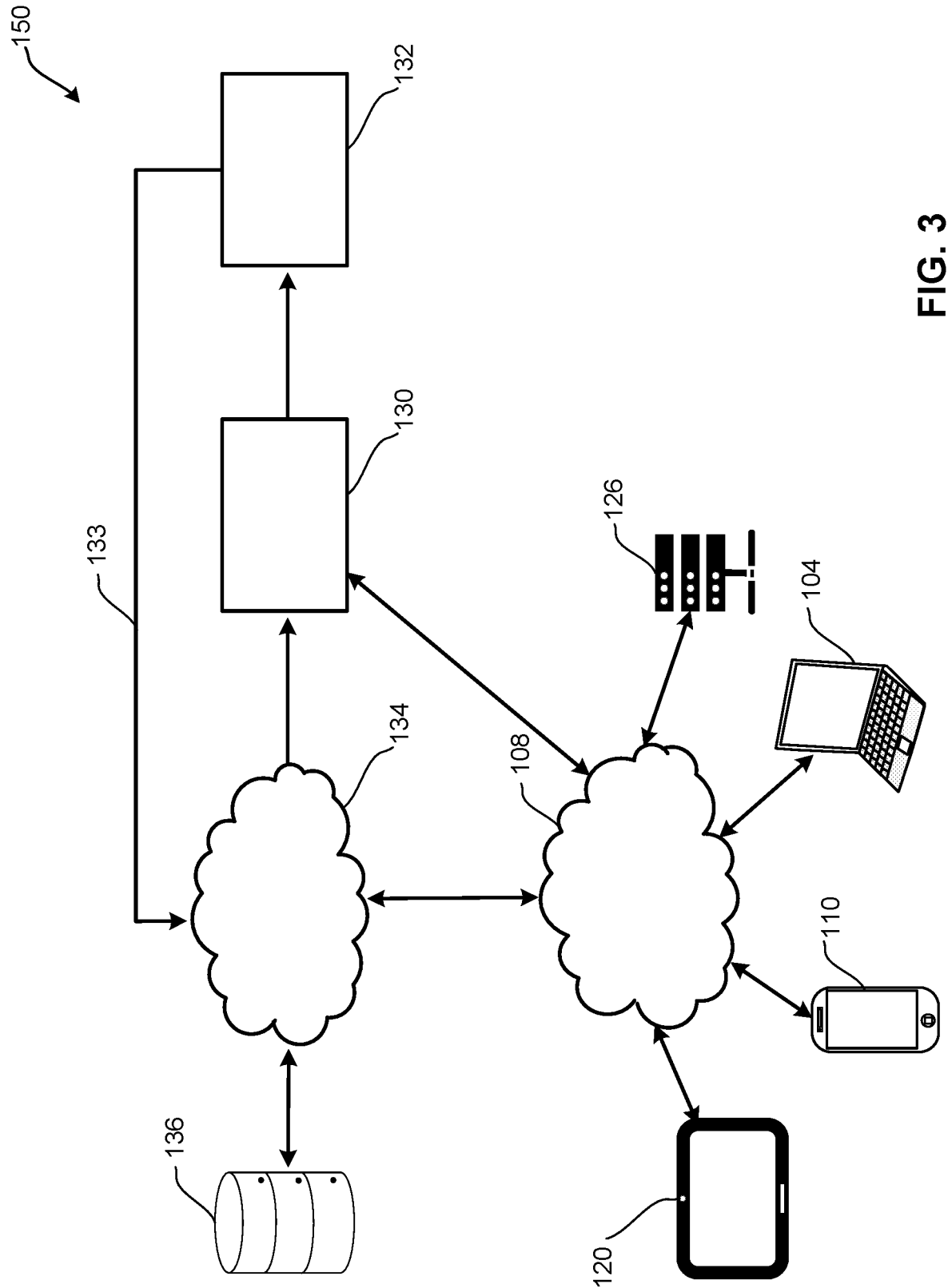
FIG. 3 illustrates a communication system in accordance with exemplary embodiments of the disclosure.

FIG. 3 illustrates an alternate electronic communication system (150) in accordance with various embodiments of this disclosure. System (150) can be the same or similar to system 100 with alternative configurations. System (150) includes network (108) with conference server (126). As shown, network (108) is configured to communicate with participant device (104) (of meeting host 1), participant device (110) of recipient 2, and participant device (120) of a meeting participant. Network (108) also communicates with recording server (134) and an analysis engine (130). Recording server 134 can be or include any suitable server. In some cases, and as illustrated in FIG. 3, recording server 134 can be separate from conference server 126.

Analysis engine (130) receives input from recording server (134) and/or network (108) to create analysis results (132), which could be based on one or more of key word(s), name(s), and/or topic(s) of the meeting. The analysis results (132) are communicated (133) to the recording server (134), which determines what part of a meeting to record and how to record it (e.g., audio, visual, or audio/visual). The recorded part of the meeting can then be stored in recording database (136). Recording database 136 can include any suitable database. Recording database 136, recording server 134, and analysis engine 130 can be part or all of a conferencing system, such as conferencing system 108.

As used herein, "engine" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

Figure 4:
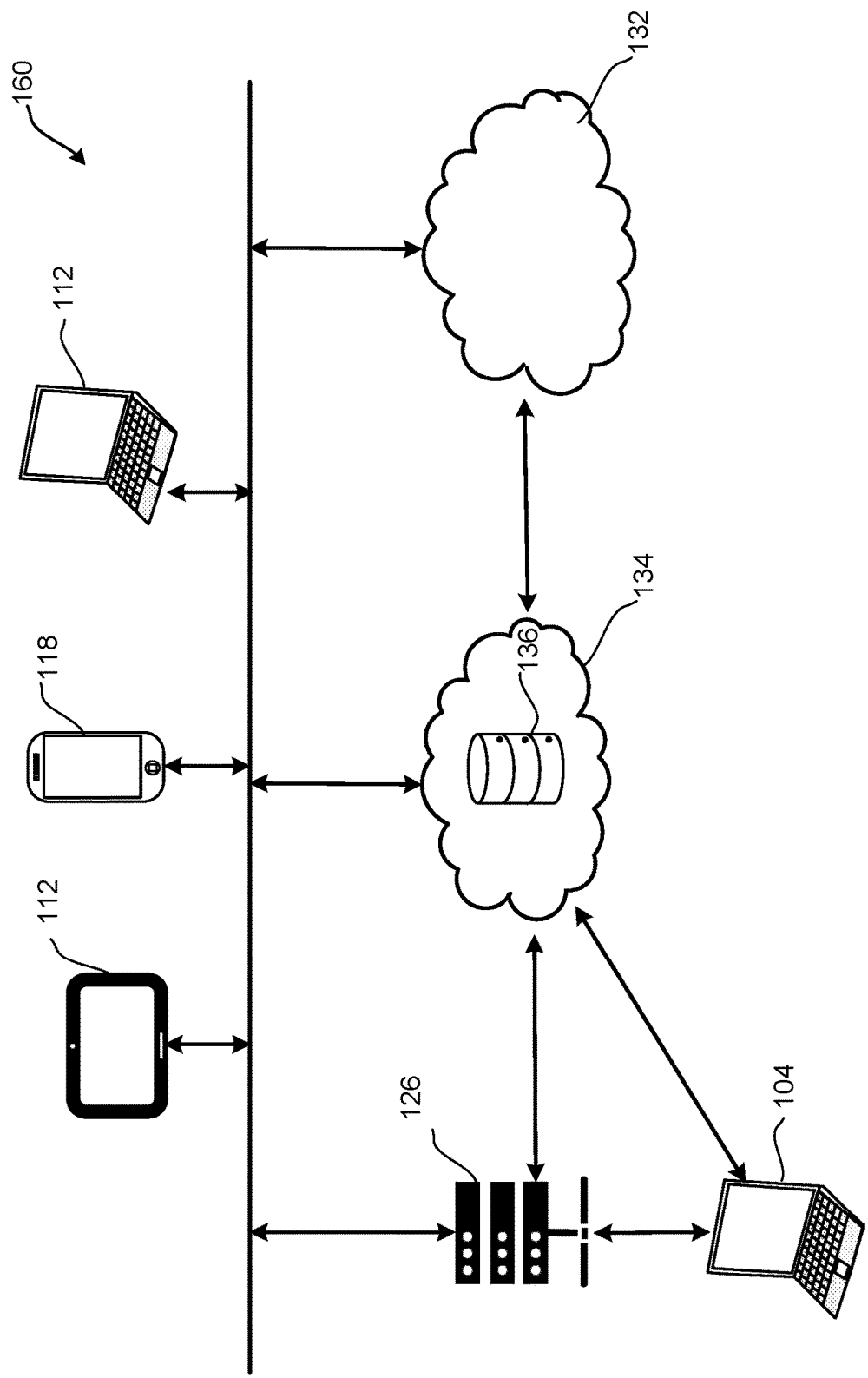
FIG. 4 illustrates a communication system in accordance with exemplary embodiments of the disclosure.

FIG. 4 illustrates an alternate electronic communication system (160) in accordance with various embodiments of this disclosure. System (160) can be the same or similar to system 100 or system 150 with alternative configurations. System (160) includes recording server (134) in communication with conference server (126), recording database (136), participant device (104) of conference host 1, analysis server (132), a meeting participant's participant device (118), and participant devices (112) of recipients 2. In some cases, and as illustrated in FIG. 4, recording server (134) can be separate from conference server (126).

Recording database (136) can include any suitable database. Recording server (134) can be or include any suitable server. Recording database (136), recording server (134), and analysis engine (130) can form all or part of a conferencing system, such as conferencing system 108.

Figure 5:
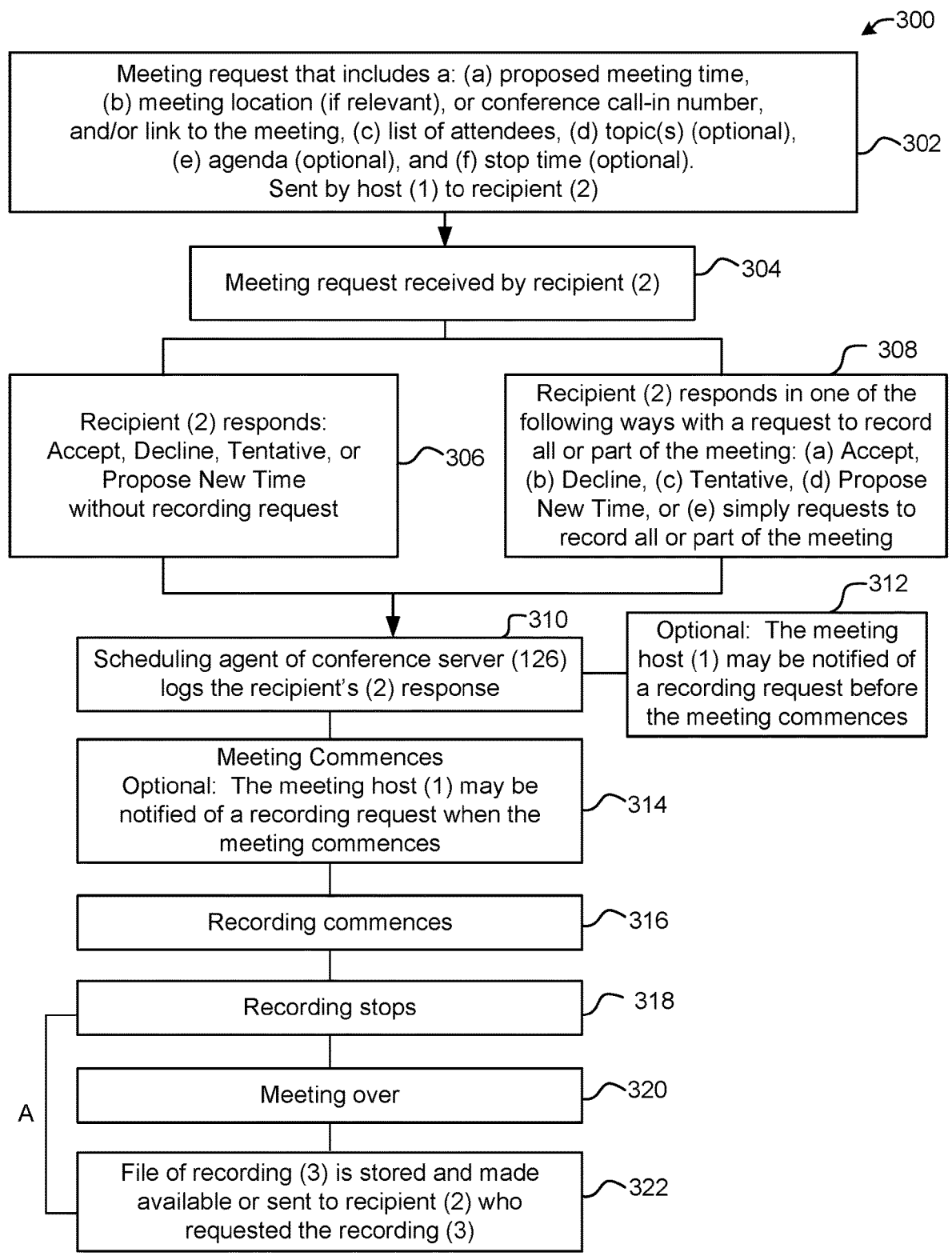
FIG. 5 illustrates a method according to in accordance with exemplary embodiments of this disclosure.

Turning to FIG. 5, an exemplary method (300) that may be performed by one or more systems (100, 150, 160) according to this disclosure is shown. Method (300) includes a meeting request (302) that is sent by a meeting host (1). Request (302) includes one or more of the meeting: title, date and start time, location (if relevant, such as for an in-person meeting, or meeting that can be attended in person or via electronic communications), call-in number, link to attend by video, and a list of invitees, topic(s), agenda, a time period for each agenda item or topic, special invitee permissions, meeting passwords, password(s) specific to a recipient, recurrence, and a stop time. The meeting request (302) or server (126, 134, or other) may include metadata indicative or any or all information in the meeting request.

The meeting request (302) (also called an "invitation" or "meeting calendar reminder"), may include metadata regarding the meeting topic(s), and the system (100, 150, or 160) can select one or more recording periods based on the metadata to help ensure the relevant topics(s) are recorded. Natural Language Processing (NLP) can be used to determine the topic being discussed and whether to record it based on the topic the recipient requested.

A typical Stanford NLP parser can be used to identify verbs and roots and thus keywords. An exemplary reference can be found at: https://stackoverflow.com/questions/42539073/nlp-extract-the-action-verb-noun-from-a-list-of-instructions. Additionally or alternatively, Count Vectors/Feature Hashing/Tf-idf (see, https://towardsdatascience.com/an-overview-for-text-representations-in-nlp-311253730af1) and/or word embeddings/training embeddings/contextualized embeddings (see, https://towardsdatascience.com/an-overview-for-text-representations-in-nlp-311253730af1) can be used to identify context within recorded information. Image recognition software coupled to a camera and in communication with server (126, 134 or other) could also or instead be used to identify visual aides used in the meeting to commence and/or stop recording. Systems and methods disclosed herein can thus optionally determine and adjust recording periods by comparing the metadata to the meeting discussion and/or visual aides.

The meeting request (302) is received (304) by a recipient (2). The recipient (2) can then compare the meeting time to his/her calendar or schedule to determine if there are conflicting events that take priority over the proposed meeting in meeting request (302).

The recipient (2), after receiving (304) a meeting request (302), may respond (306) with Accept, Decline, Tentative, or Propose New Time, in each case without requesting to record all or part of the meeting.

Recipient (2) may instead, after receiving (304) a meeting request (302), respond (308) and elect to record all or part of the meeting be selecting (a) Accept (and schedule a recording of all or part of the meeting), (b) Tentative (and schedule a recording of all or part of the meeting), (c) Decline (and schedule a recording of all or part of the meeting), (d) Propose New Time (and schedule a recording of all or part of the meeting), or (e) Record all or part of the meeting. When responding (308) to schedule a recording, the recipient (2) may have the option of selecting either an audio recording, a video recording, or an audio/video recording (316A), as shown in FIG. 5A.

Regardless of which response (306, 308) recipient (2) sends to the meeting request (302), the response is logged (310) by the scheduling agent of the conference server (126).

Turning again to FIG. 5, prior to (312) or once the meeting is started (314), the meeting host (1) may be notified that the recipient (2) has elected to record all or part of the meeting.

Figure 5A:
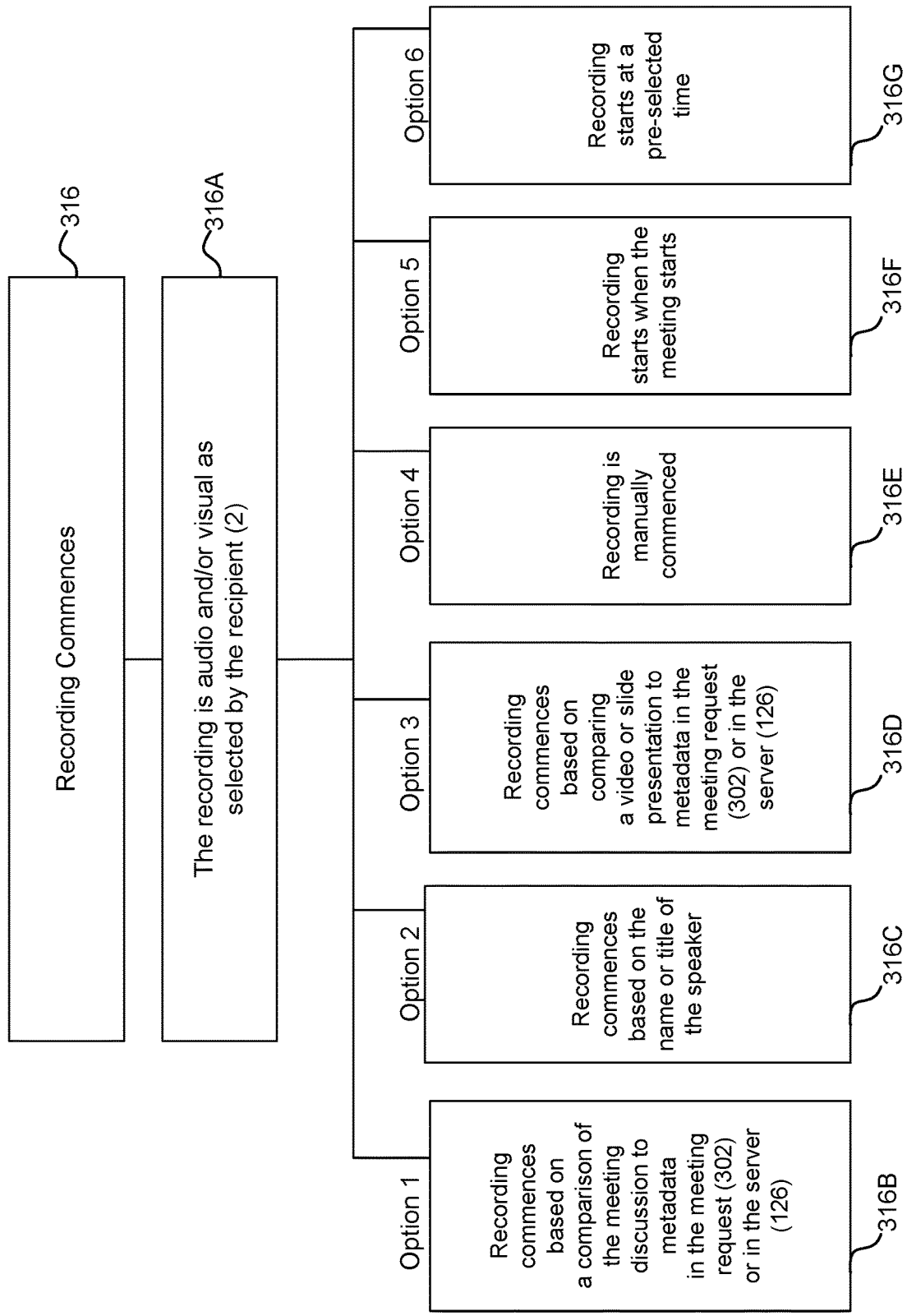
FIG. 5A illustrates recording options in accordance with exemplary embodiments of this disclosure.

Turning to FIG. 5A, during the meeting, recording may commence based on a comparison (316B) of the meeting discussion to metadata in the meeting request (302) or in the server (126). In this regard, Natural Language Processing (NLP) can be used to determine the topic being discussed and whether to record it based on the topic the recipient (2) scheduled to be recorded (308).

Alternatively, recording may commence based on the name or title of the speaker (316C) or based on comparing (316D) a video or slide presented during the meeting to metadata in the meeting request (302) or server (126). Further, the recording may be commenced by (a) a manual command (316E) by anyone, (b) when the meeting starts (316F), or (c) based on a recording start time (316G).

The recording can stop (318, shown in FIG. 5 and FIG. 5B) based on a comparison of the meeting discussion to metadata in the meeting request (302) or in the server (126). In this regard, Natural Language Processing (NLP) can be used to determine the topic being discussed and whether to record it based on the topic the recipient (2) scheduled to be recorded (step 318B).

Figure 5B:
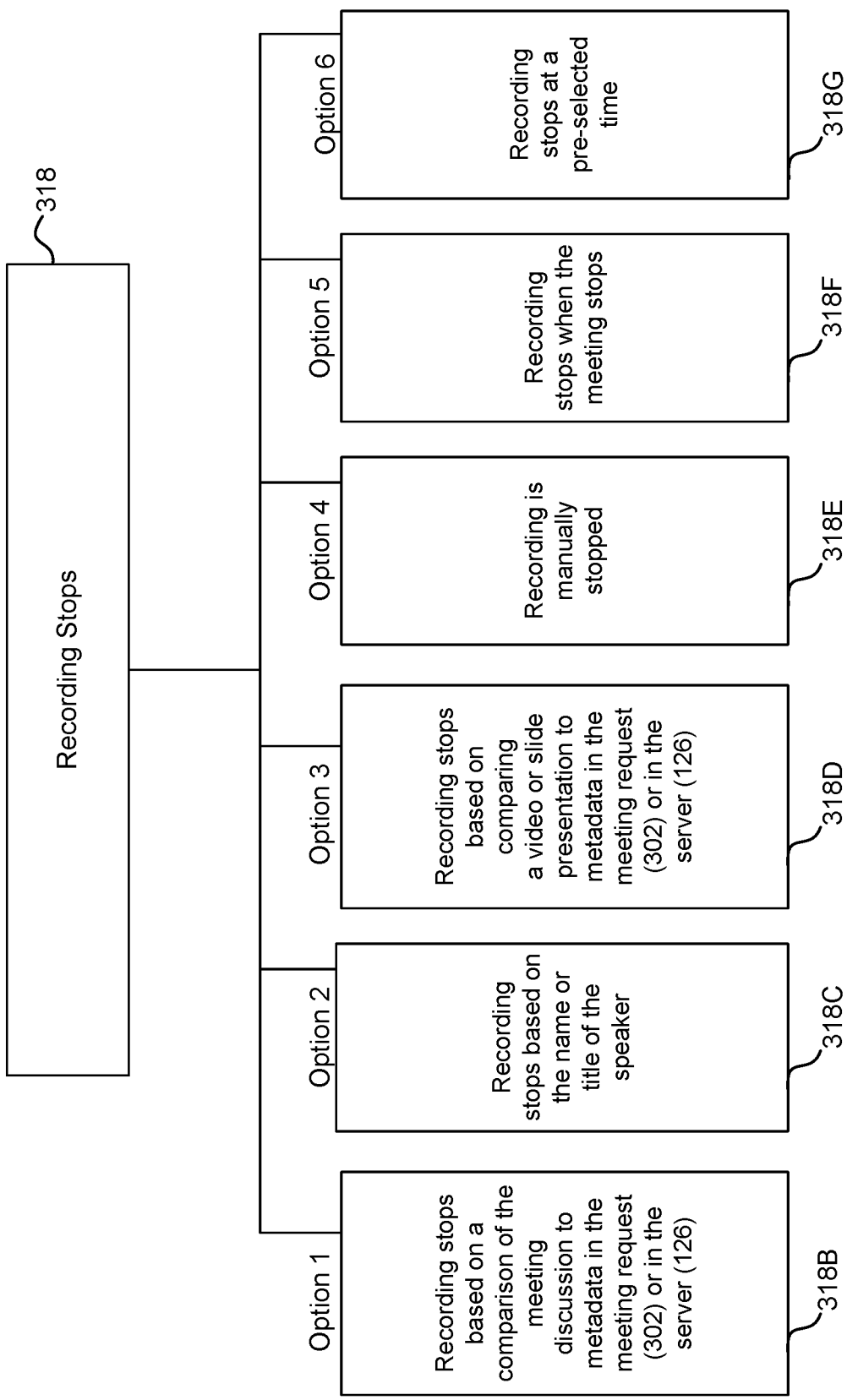
FIG. 5B illustrates manners in which a recording stops in accordance with exemplary embodiments of this disclosure.

Alternatively, as shown in FIG. 5B, the recording may stop based on (a) the name or title of the speaker (318C), or (b) comparing (318D) a video or slide shown during the meeting to metadata in the meeting request (302) or server (126). Alternatively, the recording may stop by (c) a manual command (318E) by anyone when the meeting stops (318F) or based on a recording stop time (316G).

The system (108) may commence recording (316) and stop recording (318) using the same technique for commencing and stopping or using one technique for commencing and a different technique for stopping.

Although not illustrated here, recording may commence and stop more than once so the stored recording would include more than one part of the meeting.

Figure 5C:
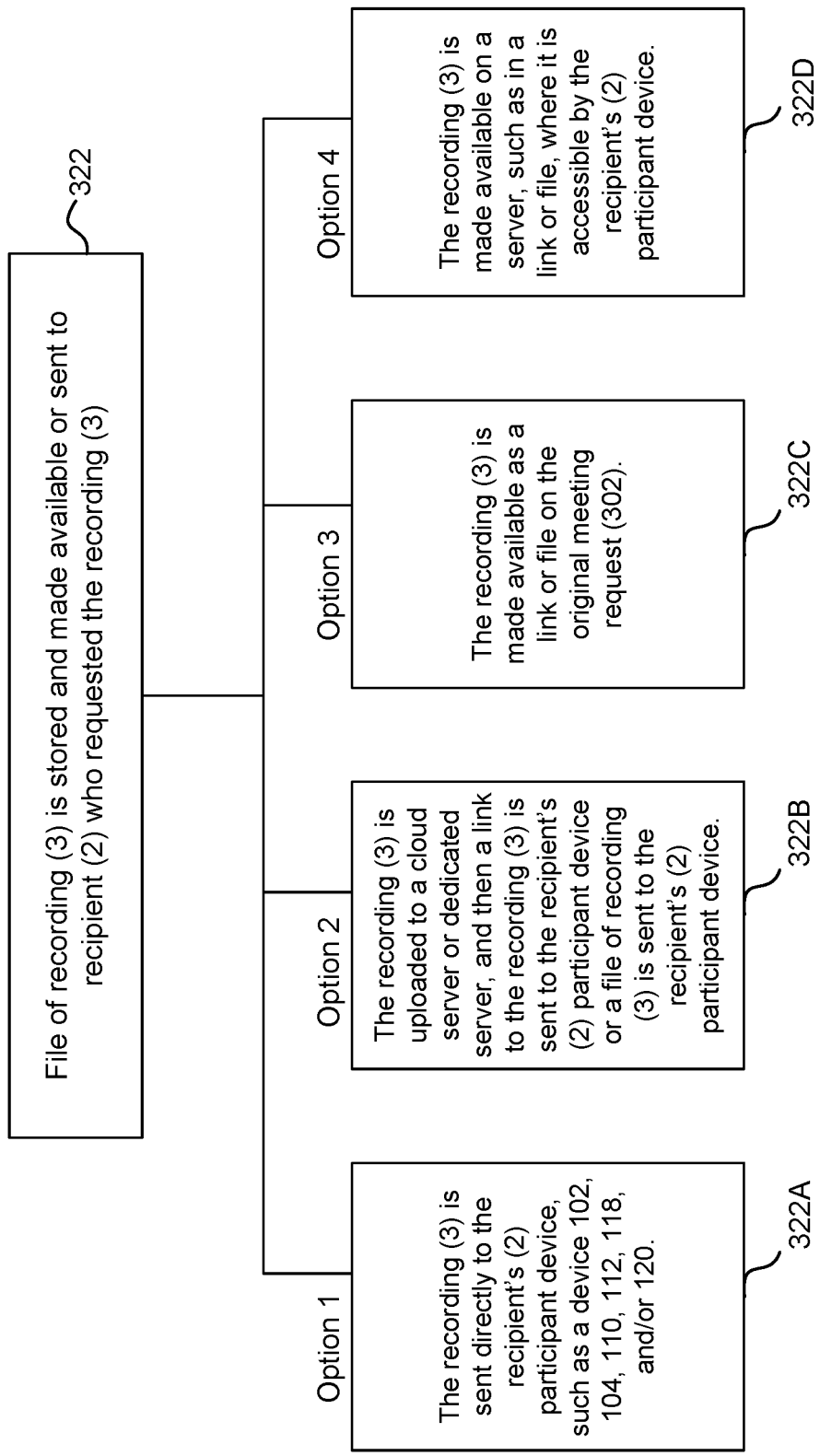
FIG. 5C illustrates manners in which a stored recording is made accessible to a recipient in accordance with exemplary embodiments of this disclosure.

Turning to FIG. 5C, the recording is stored (322) and made available to the recipient (2) either when the recording is complete (path A in FIG. 5) or when the meeting ends. The stored recording (3) is made electronically accessible to one or more participant devices 102, 104, 110, 112, 118, and 120 of the recipient (2). The stored recording (3) may be (a) directly sent to the recipient's (2) participant device (322A), (b) uploaded to a cloud server or dedicated server, and then be sent to the recipient's (2) participant device as a link or file (322B), (c) accessible as a link or file on the original meeting invitation (302) sent to the recipient (2) (322C), or (d) accessible to the recipient's (2) participant device as a link or file on a server or portal (322D). The recipient (2) then has the option to download the recorded file (3) to his/her participant device, to another device, or to access it on a server or portal.

Figure 6:
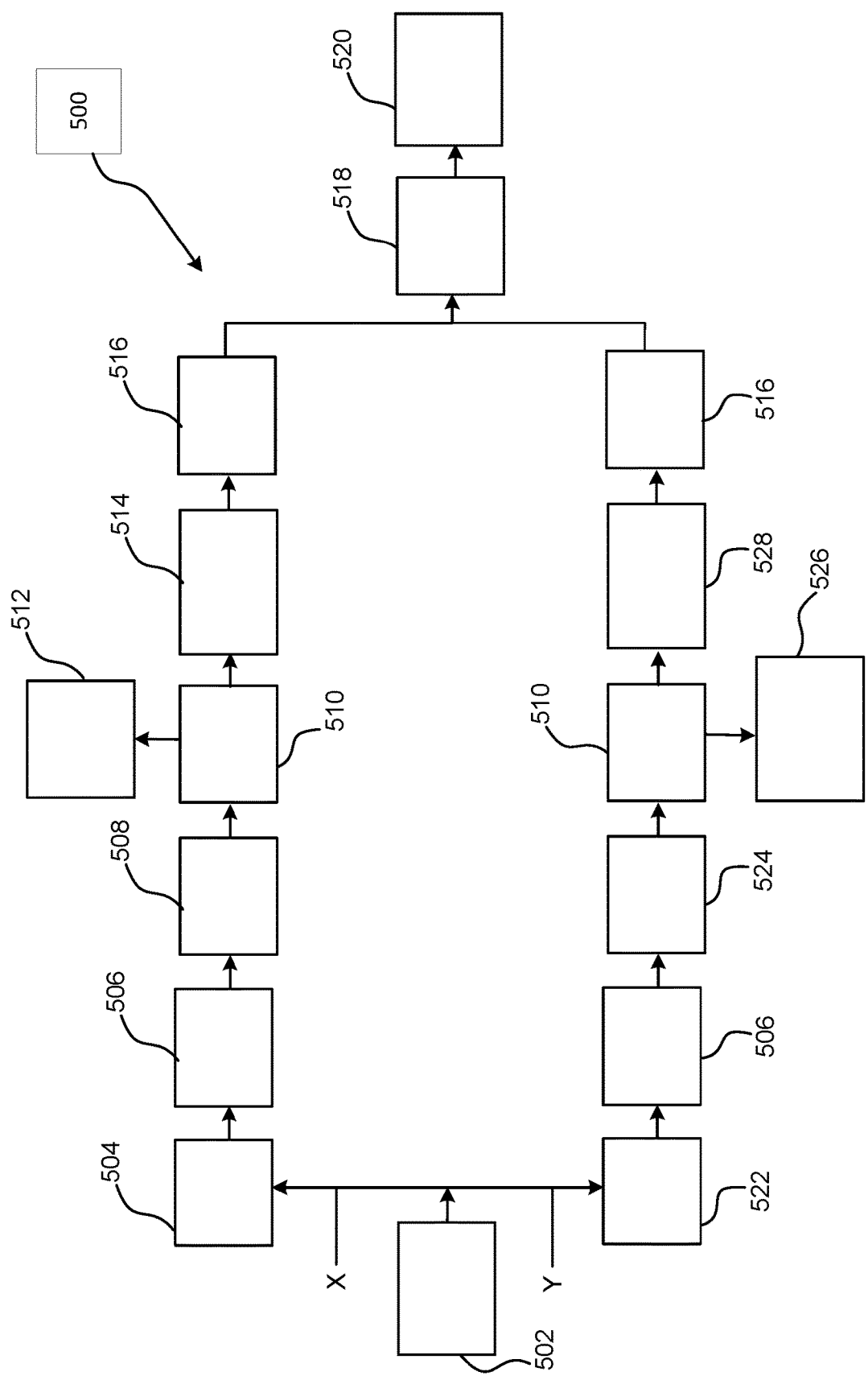
FIG. 6 illustrates an exemplary method in accordance with exemplary embodiments of this disclosure.

FIG. 6 shows another exemplary method (500) according to this disclosure. A new meeting invitation (502) is initiated by a host. In this method the invitation 502 is sent to a recipient 2 and there are two alternate branches X and Y of responses and events that may follow.

Figure 7:
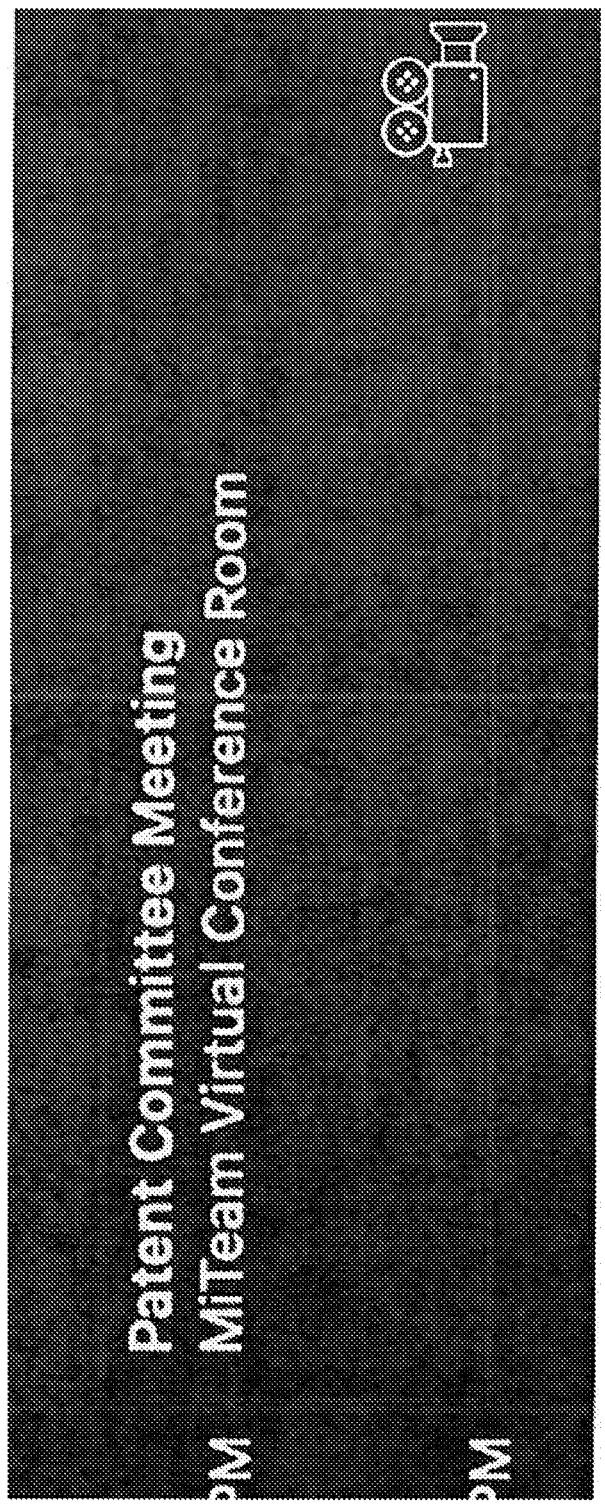
FIG. 7 illustrates an exemplary message sent to a recipient with a link to download a recording of all or part of a meeting.

In branch X the recipient 2 accepts (504) the meeting invitation (502) and the acceptance (504) is transmitted to a scheduling agent (506), which may be conference server (126), recording server (134), or another device of system 100, 150, or 160, with the information that recipient 2 will attend and record the meeting (508). When the meeting starts (510) the host 1 is notified (512) of the recording and the meeting or part thereof is recorded (514). The meeting ends (516) and the recording is saved (518), such as by recording database 136. Recipient 2 may receive a notification that the recording is saved, and can be sent (520) a download link to his/her participant device to access the recording. An example communication with a link to download a recorded meeting file is shown in FIG. 7.

In alternate branch Y, the recipient 2 tentatively accepts (522) the meeting invitation (502) and the acceptance (522) is transmitted to a scheduling agent (506), which may be conference server (126), recording server (134), or another device of system 100, 150, or 160, with information that recipient 2 will record the meeting only (524). When the meeting starts (510) the host is notified (526) that the meeting or part thereof will be recorded and of the recipient's virtual attendance. The recording and virtual attendance commence (528). The meeting ends (516) and the recording is saved (518), such as by recording database 136. Recipient 2 may receive a notification that the recording is saved, and can be sent (520) a download link to his/her participant device to access the recording. An example communication with a link to download a recorded meeting file is shown in FIG. 7.

Figure 8:
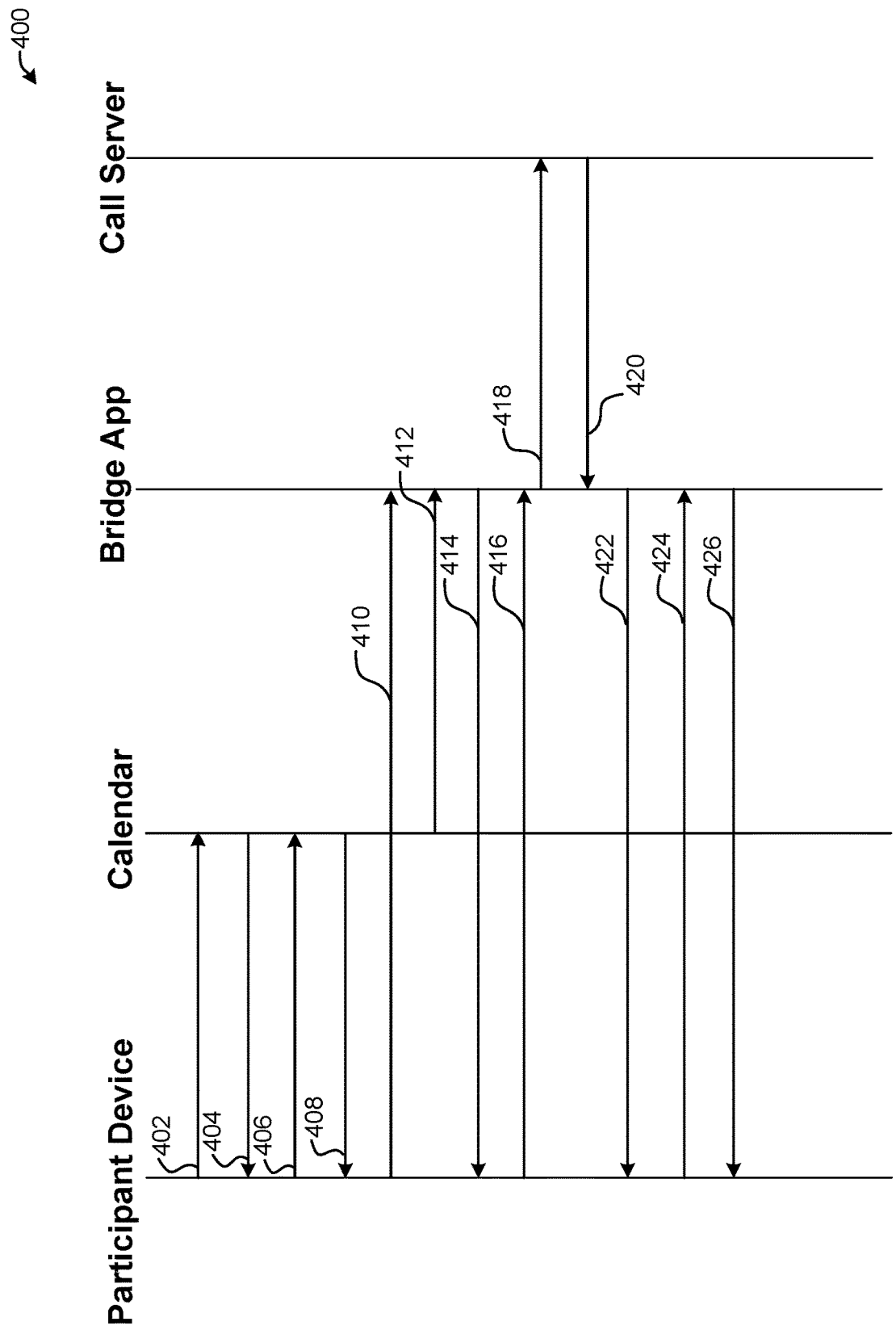
FIG. 8 illustrates a search and recording service call flow in accordance with exemplary embodiments of this disclosure.

FIG. 8 shows a search and recording service call flow relating to an exemplary method of this disclosure. In step (402), a recipient 2 opens a meeting list on a participant device, such as one previously described. In step (404), the meeting list is visible to the recipient 2 and recipient 2 can open (step 406) an example meeting and review (step 408) the meeting details. In step (410), the recipient 2 can click on the meeting URL and open (step 412) the meeting application.

Recipient 2 may now select (such as by clicking on an icon) to record (416) all or part of the meeting. All or part of the meeting is then recorded (418) and sent (420) to be saved (422). Recipient 2 can then open the stored, recorded meeting (424), and download (426) the saved recording.

Systems and methods according to this disclosure effectively create a new function for collaboration platforms. Traditionally, a recipient can attend a meeting or part of a meeting regardless of whether the recipient attends, and to make a stored recording accessible to a participant device of the recipient. This recording option can be used in essentially all meeting applications.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. An electronic communication system comprising:
    a conferencing system comprising a conferencing server, a recording server in communication with the conferencing server, and a recording database;
    a plurality of participant devices coupled to the conferencing server; and
    an analysis engine in communication with the recording server and configured to receive input from the recording server to create analysis results;
    wherein the conferencing system is configured to receive meeting information and forward a meeting invitation that includes meeting metadata to each of the plurality of participant devices, the metadata comprising one or more topics of the meeting,
    wherein the analysis engine is configured to create the analysis results based at least on key words, names, and topics of the meeting information and communicate the analysis results to the recording server which is configured to determine a part of the meeting to record, a format to record the part in one or a combination of audio and visual format, and store the recorded part of the meeting in the recording database; and
    at least a first one and a second one of the plurality of participant devices is configured to provide the conferencing system a response to the meeting invitation, wherein the response includes metadata and (a) accepts the meeting invitation, and (b) includes a command to record the part of the meeting in the format that is less than an entire meeting, and the conferencing system is configured to select the part of the meeting to record based at least on the analysis results, comparing the metadata to determine if the one or more topics are relevant in the response to content of the entire meeting, and analyzing the content by utilizing image recognition software coupled to a camera that identifies visual aids used in the entire meeting, and
    wherein the part of the meeting commanded to be recorded by the first one of the plurality of participant devices is different from the part of the meeting commanded to be recorded by the second one of the plurality of participant devices.

2. The electronic communication system of claim 1 that is configured to begin a recording of the meeting only when one of the one or more topics of the meeting commanded to be recorded by at least one of the plurality of participant devices begins and is configured to stop recording when the one or more of the topics of the meeting ends.

3. The electronic communication system of claim 1, wherein the meeting information includes an agenda that includes the one or more topics.

4. The electronic communication system of claim 3, wherein the agenda includes time periods associated with at least one of the one or more topics.

5. The electronic communication system of claim 1, wherein the meeting host receives a notification that the participant has commanded the recording of part of the meeting.

6. The electronic communication system of claim 1, wherein the meeting information comprises one or more of special recipient permissions, participants, meeting start time and date, meeting stop time and date, meeting parameters, meeting passwords, participant specific passwords, meeting title, and recurrence.

7. The electronic communication system of claim 1, wherein the meeting information includes one or more topics of the meeting, and the participant device is configured to command the conferencing system to schedule the recording of any of the one or more topics of the meeting.

8. The electronic communication system of claim 1 that is configured to record only a video of the part of the meeting and not audio or only an audio of the part of the meeting and not video.

9. The electronic communication system of claim 1, wherein the recording starts and stops based on comparing a video or slide shown during the meeting to metadata in the meeting response.

10. The electronic communication system of claim 1, further comprising a Natural Language Processing (NLP) engine that determines the recording start time and the recording stop time based in part on determining which of the one or more topics is being discussed at the meeting and whether to record the part of the meeting based at least on the one or more topics being determined as relevant.

11. An electronic communication system comprising:
    a conferencing system comprising a conference server, a recording server in communication with the conferencing server, and a recording database;
    a plurality of participant devices in communication with the conferencing server; and
    an analysis engine in communication with the recording server and configured to receive input from the recording server to create analysis results;

wherein the conferencing system is configured to (a) receive meeting information and transmit a meeting invitation that includes meeting metadata to each of the plurality of participant devices, the metadata comprising one or more topics of the meeting;

wherein the analysis engine is configured to create the analysis results based at least on key words, names, and topics of the meeting metadata and communicate the analysis results to the recording server which is configured to determine a part of the meeting to record, a format to record the part in one or a combination of audio and visual format, and stores the recorded part of the meeting in the recording database; and wherein at least one of the plurality of participant devices is configured to send a response that includes metadata, wherein the response (b) accepts the meeting invitation, and (c) commands a recording of the part of the meeting in the format that is less than the entire meeting, and the conferencing system determines the part of the meeting that is less than the entire meeting based at least on the analysis results and comparing the metadata to determine if the one or more topics are relevant in the response to the meeting content by utilizing image recognition software coupled to a camera that identifies visual aids used in the entire meeting.

12. The electronic communication system of claim 11 that transmits the recording to the one of the plurality of participant devices.

13. The electronic communication system of claim 11 that generates a link accessible to the participant, wherein the recording requested by the participant is accessible by the link.

14. The electronic communication system of claim 11 that is configured to record only a video of the part of the meeting and not audio or only an audio of the part of the meeting and not video.

15. An electronic communication method comprising the steps of:

using a conference server, sending a meeting invitation including metadata comprising one or more topics of the meeting to a plurality of participant devices that are in communication with the conference server by a plurality of network participant devices; and using one of the plurality of participant devices, transmitting a response to the meeting invitation to the conference server, wherein the response includes response metadata, and the response (a) accepts the meeting invitation, and (b) includes a command to record a part of the meeting that is less than the entire meeting, wherein the conference server determines the part of the meeting to be recorded based on an analysis engine creating analysis results based key words, names, and topics of the metadata and comparing the metadata to determine if the one or more topics are relevant in the response to visual aids used in the entire meeting by utilizing image recognition software coupled to a camera;

communicating the analysis results to a recording server in communication with the analysis engine to determine a part of the meeting to record and a format to record the part in one or a combination of audio and visual format, and wherein each of the other of the plurality of participant devices is configured to transmit a response to the meeting invitation to the recording server to record the part of the meeting that is less than the entire meeting and that is different from the part commanded to be recorded by the one of the plurality of participant devices; and storing the part of the meeting in a recording database.

16. The electronic communication method of claim 15, wherein beginning the recording is based upon the metadata in the response and the conference server and the recording server are part of a network, the method comprising communicating the analysis results to the recording server to further determine the part of the meeting to record and how to record the part of the meeting.

17. The electronic communication method of claim 15 that further includes the step of sending the meeting host a notification that the participant is recording the part of the meeting.

18. The electronic communication method of claim 15 that further includes the step of transmitting the recording to the one of the plurality of participant devices.

19. The electronic communication method of claim 15, wherein the part of the meeting to be recorded includes a plurality of topics of the meeting.

20. The electronic communication method of claim 15 that is configured to record only a video of the part of the meeting and not audio or only an audio of the part of the meeting and not video.

* * * * *